United States Patent [19]

Goff

[11] 3,824,651

[45] July 23, 1974

[54] FALLER BAR CONSTRUCTION

[76] Inventor: Howard G. Goff, 402 Shallow Ford, Chattanooga, Tenn. 37411

[22] Filed: Feb. 23, 1973

[21] Appl. No.: 335,129

Related U.S. Application Data

[63] Continuation-in-part of Ser. No. 222,815, Feb. 2, 1972, abandoned.

[52] U.S. Cl............................................. 19/129 R
[51] Int. Cl............................................. D01g 19/10
[58] Field of Search................................. 19/129 R

[56] References Cited
UNITED STATES PATENTS

3,532,077   10/1970   Mann et al...................... 19/129 R

FOREIGN PATENTS OR APPLICATIONS

1,085,209   9/1967   Great Britain.................... 19/129 R
  736,163   9/1955   Great Britain.................... 19/129 R

OTHER PUBLICATIONS

Hood Co. Publication – Faller Bar

*Primary Examiner*—Dorsey Newton

[57] ABSTRACT

A faller bar for a textile combing machine comprising a pair of L-shaped reinforcing members extending substantially throughout the length of the bar and being spot welded or otherwise secured to one another to form a channel in which is disposed in spaced relationship a series of pins and retained in the channel by means of a plastic material extending therein. A pair of metal plates are provided at each end of the bar and are retained in their respective positions by means of a suitable plastic material extending thereover. The metal plates are secured to the channel forming members as by a line of weld in order to increase the rigidity of the bar.

2 Claims, 6 Drawing Figures

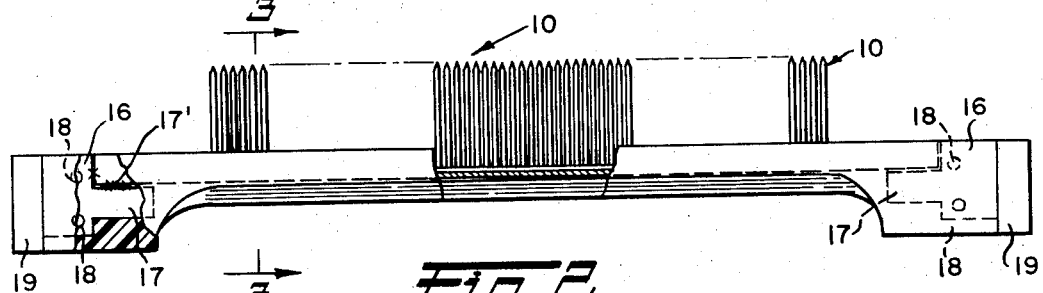
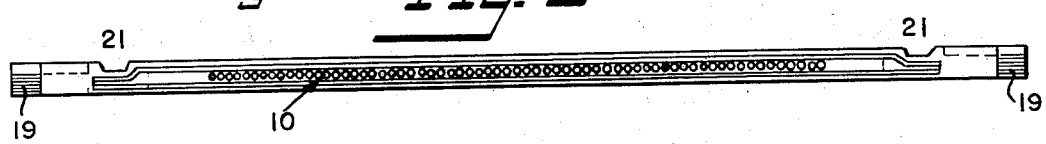
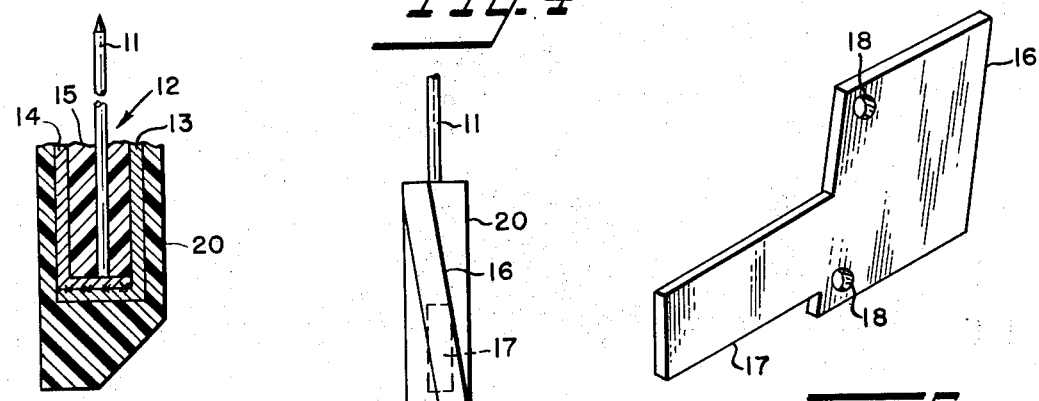
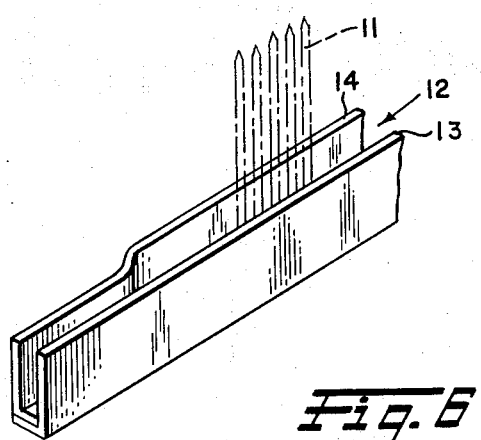

3,824,651

FALLER BAR CONSTRUCTION

This is a continuation-in-part application of Ser. No. 222,815 filed Feb. 2, 1972 now abandoned.

BACKGROUND OF THE INVENTION

Faller bars as are commonly employed in a textile combing machine are subjected to considerable wear and tear, particularly the pins forming a part of the bar often becoming bent on encountering a foreign substance in the material being carded. When such damage is occasioned to one or more of the pins, the bar must of necessity be removed and the damaged pin replaced with a new pin and such interchange or replacement of pins is a costly and time consuming operation. Usually, the pins are retained within a channel by means of some suitable adhesive or plastic and in order to replace a damaged pin it becomes necessary to melt or otherwise treat the pin retaining substance to release the damaged pin and permitting for the replacement thereof. Also, the channel within which the pins are retained is of considerable importance since the same must be of such structural strength so as to withstand the forces exerted thereon during the carding operation.

With the above in mind, it is the primary object of the invention to provide a faller bar of sufficient strength to withstand the forces applied thereto during the carding operation and to be constructed in such a manner that it will be more expedient to replace the entire faller bar when some of the pins thereon become damaged.

Another object of the invention is to provide a novel manner of constructing the channel member for the pins whereupon the same will have the required strength and rigidity to withstand the forces applied to the bar during carding of the raw material.

Another object of the invention is to secure one end of each of the metal plates to the channel extending therebetween so as to provide a more rigid bar structure than heretofore provided.

Another object of the invention is to completely encase the entire length of the channel and metal plates at the ends of the bar, save for the extreme ends of the plates, in a suitable plastic material which will assist in retaining the channel and metal plates in their associated relationship to one another.

Another object of the invention is to construct a faller bar in different sizes or widths having a different number of pins and to employ different colored plastics for covering the channel and parts of the metal plates to thus enable one to determine the size of the bar by a mere inspection of the color of the plastic employed, thus enabling one to quickly determine the size of the bar.

For other objects and attendant advantages of the present invention, reference may now be had to the following detailed description taken in conjunction with the accompanying drawings wherein:

FIG. 1 is a perspective view with parts broken away of a faller bar constructed in accordance with the present invention.

FIG. 2 is a top plan view of the faller bar.

FIG. 3 is an enlarged section taken on line 3—3 of FIG. 1, looking in the direction of the arrows.

FIG. 4 is an enlarged end view of the bar.

FIG. 5 is an enlarged view showing the perspective the metal plate for the ends of the bar, and FIG. 6 is an enlarged view showing the channel employed in the formation of the bar.

PREFERRED EMBODIMENTS OF THE INVENTION

Referring now to the drawings, there is disclosed at FIG. 1 thereof a faller bar designated generally by reference numeral 10. The bar comprises a series of sharpened pins 11 equidistantly arranged within a channel designated by reference numeral 12. Channel 12 comprises a pair of L-shaped members constructed of any suitable material, preferably of hardened steel or the like. As can be seen more clearly in FIGS. 3 and 6 of the drawings, the channel 12 comprises L-shaped members 13 and 14 extending parallel to one another and when assembled as shown in these views of the drawings, the bottom walls of the L-shaped members are caused to overlap and when thus positioned, the same may be secured to one another as by spot welding or by any other well known manner of securing the parts together to form a permanent bond of the metals in their assembled relationship to one another.

Pins 11 are of hardened steel or any other suitable material and are so arranged within the channel 12 as to effectively card the raw materials which are fed into the carding machine with which the faller bar of the present invention is associated. To retain the pins 11 in their desired position within the channel, a suitable plastic material 15 is introduced into the channel and allowed to harden, whereupon the lower ends of the pins which have been previously placed therein will be embedded in the plastic material and retained therein. Preferably, the pins 11 will be centered in the channel 12 as clearly shown in FIG. 3 of the drawings. Also, as can be seen in FIG. 3 of the drawings, the lower ends of the pins extend to a position where they will be in contact with the upper L-shaped member 14.

Extending at each end of the bar is a metal plate 16 constructed of a hardened steel or any other suitable material and preferably comprises a plate structure formed as shown in FIG. 5 of the drawings which includes a tang 17 and openings 18 formed in the body of the plate 16 for a purpose to be described more fully hereinafter. As shown at FIG. 1 of the drawings, the outer ends of the channel member 12 extended over and beyond the aforementioned tangs 17 thereto as by a line of weld 17'. This line of weld is provided so as to increase the rigidity of the entire bar when the same is used in association with the carding machine. This is in contradistinction from previously known faller bars wherein the ears associated with the channel are left unconnected with the channel, and this provides for a weakened area at that portion of the bar.

In the formation of a faller bar as constructed in accordance with the spirit of the invention, a suitable mold is provided to retain the already joined L-shaped members 13 and 14 in the manner aforesaid. Also, the metal plates 16 are likewise held in the mold, and a line of weld is applied to any known manner between the inner ends of the plastic 16 and outer ends of the channel member. The welding of these parts together, as aforesaid, will enchance the rigid characteristics of the bar which is desirable. Following the assembly of the parts, as aforesaid, a suitable plastic material is caused to entirely envelop the channel shaped member 12 as well as all of the metal plates 16 except for the extreme outer ends thereof as indicated at 19 which is left uncoated or exposed to form a key for engagement with the shifting mechanism of the carding machine in a well known manner. As is usual in bars of this type, the tang 17 is adapted to extend on a true vertical with respect to the channel 12 and plastic covering 20 whereas the opposite end of the plate which forms the key for the bar is set off at an angle with respect to the tang as shown more clearly in FIG. 4 of the drawings. During the assembly of the parts in the manner aforesaid, a guide slot 21 is formed at each end of the bar for a purpose which is well known in the art. The openings 18 formed in the plates 16 will assist in retaining the plates embedded in the plastic material in a well known manner.

Thus, I have described the formation of a faller bar which may be economically manufactured and by reason of the overlap of the L-shaped members, and the welding or otherwise securing the end plates to the channel, the rigidity imparted to the bar is far superior than the known faller bars of the same general construction and the fact that the entire bar, except for the extreme ends of the plates, is entirely encased within the plastic material which acts to rigidify the bar assembly that much more.

As can be appreciated, the bar constructed as aforesaid can be mass produced and when so manufactured, the same will be much less in cost than the known method of constructing these bars, thus enabling the replacement of the entire faller bar when the same, for one reason or another, becomes damaged and has to be repaired. The simplicity of the construction and the costs for producing the same will make it more feasible to replace the entire bar with a new bar upon damage to some part of the bar.

As stated previously, faller bars come in different sizes having differing number of pins mounted within the channel and it is contemplated to employ different colored plastic material for different size bars. This will enable one to quickly discern the size bar merely by identifying the color plastic employed for covering the bar.

While I have described one manner of constructing the faller bar of the present invention, it will be apparent that certain changes can be made in the construction of the same and the scope of this invention should therefore be determined by the appended claims.

I claim:

1. A faller bar construction comprising a pair of spaced parallel L-shaped members each L-shaped member having a bottom wall, the bottom walls of each of said L-shaped member disposed in overlapping relationship with one another and secured to one another at the area of overlap to form a channel area, pins extending within the said channel area and retained therein by a suitable plastic material extending within the said channel area, plate members extending beyond the ends of said L-shaped members and being secured thereto, and a plastic covering extending over the said L-shaped members and encasing all of said L-shaped members and said plate members except for the extreme outer ends of said plate members which are left uncoated.

2. The structure recited in claim 1 wherein said L-shaped members are formed of hardened steel.

* * * * *